United States Patent
Wireman et al.

[11] 3,901,756
[45] Aug. 26, 1975

[54] CLOSED LOOP LINE FOLLOWER

[75] Inventors: Jack Wireman, Yorba Linda; Richard Dean Tellinghuisen, Fountain Valley, both of Calif.

[73] Assignee: AMF Incorporated, White Plains, N.Y.

[22] Filed: Aug. 26, 1974

[21] Appl. No.: 500,273

[52] U.S. Cl. ............. 156/361; 156/117; 156/130; 156/123; 156/351; 156/357; 156/367; 156/397
[51] Int. Cl.² .......................................... B29H 17/02
[58] Field of Search .......... 156/117, 130, 123, 350, 156/351, 361, 367, 368, 397

[56] References Cited
UNITED STATES PATENTS

| | | | |
|---|---|---|---|
| 3,251,722 | 5/1966 | Holman | 156/397 X |
| 3,308,000 | 3/1967 | Holman | 156/397 |
| 3,418,191 | 12/1968 | Dieckmann et al. | 156/130 X |
| 3,497,408 | 2/1970 | Hineline | 156/397 X |
| 3,523,854 | 8/1970 | Cautarutti | 156/397 |
| 3,717,529 | 2/1973 | Rattrag | 156/397 |
| 3,837,967 | 9/1974 | Symons | 156/397 |
| 3,843,482 | 10/1974 | Wireman et al. | 156/397 |
| R25,349 | 3/1963 | Hanson | 156/397 X |

*Primary Examiner*—Clifton B. Cosby
*Attorney, Agent, or Firm*—George W. Price; Martin Smolowitz

[57] ABSTRACT

A method and apparatus employed for controlling and programming the deposition of rubber tread material on a tire body. The control system employed therefor uses a sensing device which may be magnetic, optical or edge sensing that is adapted to follow a scribed line or a color contrast area which line or area conforms to a desired tread profile. The apparatus employs electrical circuitry which continuously positions the sensing device, and in effect, the control functions in response to the deposition of freshly deposited material.

11 Claims, 5 Drawing Figures

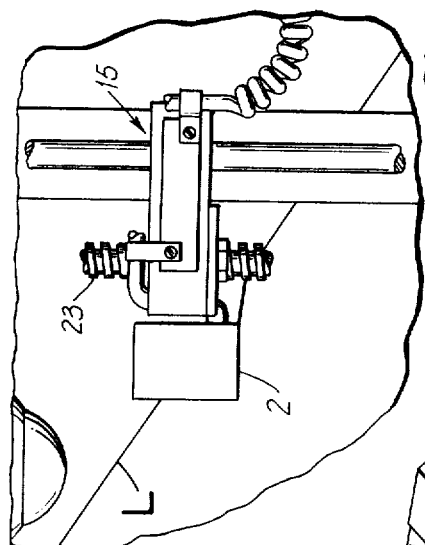
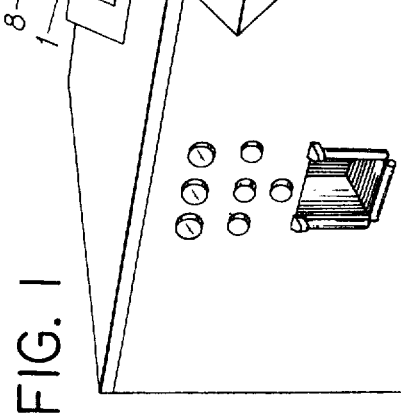
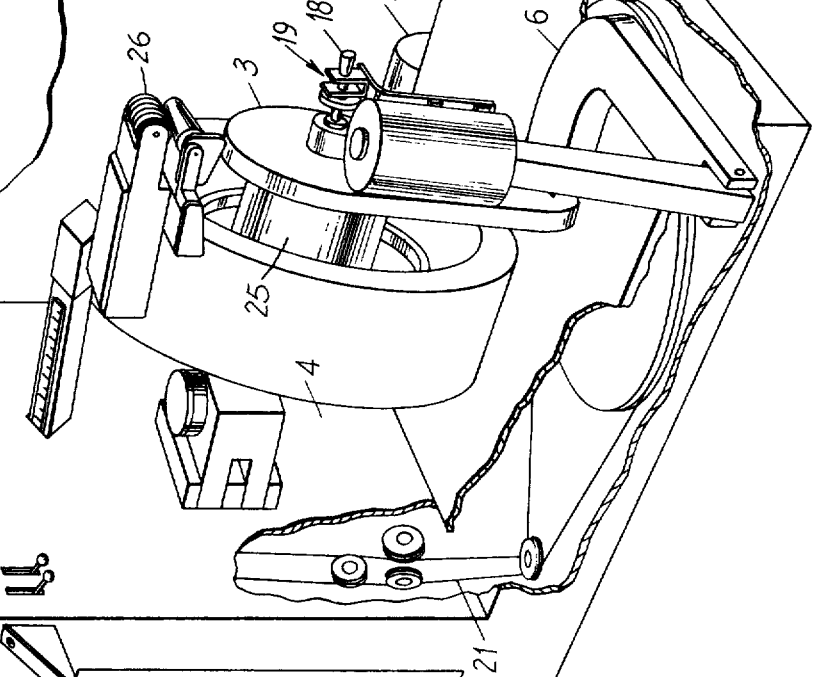
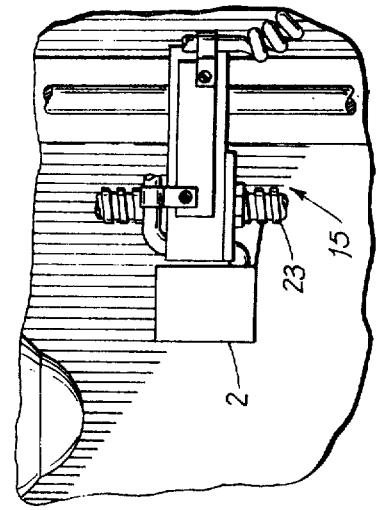
FIG. 1
FIG. 2b
FIG. 2c

CLOSED LOOP LINE FOLLOWER

The present invention is directed to a method and apparatus for the disposition of rubber upon a tire surface. More particularly, the invention is directed to an apparatus and method for controlling and programming the disposition of rubber tread material upon a tire body or carcass.

Apparatus for the deposition of a rubber strip of material, i.e., rubber ribbon on a tire surface is well known. The quality of the finished product i.e., tread characteristics, is directly related to control over the feed of rubber strip onto a tire body. Inherent to this operation is the need to control such process variables as, rate of feed, ribbon dimensions, orientation of tire surface with respect to ribbon feed, orientation of ribbon feed, spacing between successive ribbon strips, etc.

Applicants are familiar with various techniques employed in programming the deposition of rubber ribbon on a tire surface. For example, in U.S. Pat. No. 3,177,918 assigned to the assignee of the present invention, there is disclosed and taught method in which the contour of the ultimately laid rubber ribbon is governed by a plurality of incremental wraps controlling the flow of rubber ribbon to the tire surface being treated. Though this system appears to satisfy most conditions, there are situations where a more precise, repeatable, and better defined tire surface contour are desired and it is with this area that the present invention is directed to.

Accordingly, it is the main object of the present invention to overcome the defects of the prior art.

It is still another object of the present invention to provide an apparatus capable of precisely depositing a plurality of ribbon layers on a tire surface.

Still a further object of the present invention is to provide a method of applying rubber material to a tire surface with the tire radial axis velocity moving at a rate proportion to the circumferential spin of the tire surface.

Still a further object of the present invention is to employ a control system capable of sensing a predefined contour reflecting a tire surface configuration and sensing and correcting for errors in the process.

The principal features of the invention include a method of controlling the deposition of elastomeric material in accordance with a predefined profile which corresponds to a product contour, including the steps of: scribing a line on an electro-conductive paper which line represents said product contour in cross-section; positioning a sensing device in proximity to said line whereby said device being connected to supply means for supplying said elastomeric material; generating an electrical signal in response to deviation of said sensing device from said scribed line causing the rate of supply of material to be deposited to advance in accordance with such electrical signal; directing the relative movement of a body having substrate to be surfaced with material being supplied thereto, through the energization of motor means by an electrical signal responsive to the position of said sensing device with respect to said scribed line; and continuously positioning said sensing device in the X-Y coordinates responsive to the disposition of freshly deposited elastomeric material causing adjacent layers of such material to be deposited on such body surface.

Also within the scope of the invention is an apparatus for controlling the deposition of elastomeric ribbon material upon a body surface consistent with a predefined profile of the ultimate product surface including: an electro-conductive substrate adapted to receive said predefined profile; a sensing assembly disposed in proximity to said substrate for seeking a null position with respect to said profile, wherein said sensing assembly includes an optical scanning means disposed upon ways, being positionable in the X-Y coordinate axis responsive to the movement of a body surface to be worked upon, said sensing assembly being coupled to a body surface orientation assembly whereby deviation of said sensing device from said predefined contour causes an electrical signal to be generated allowing said assembly to move relative to said material being deposited in response to said electrical signal; control means coupled to said body surface orientation assembly enabling movements of said assembly with respect to elastomeric material being disposed thereon to be consistent with the position of said sensing device with respect to said scribed line.

The present invention as an alternate embodiment employs a number of features utilizing a control system essentially including an optical scanning device.

Still other objects and advantages of the present invention will be more fully understood with respect to the specification and appended claims together with the drawings.

In the drawings:

FIG. 1 is a perspective view of the invention used in conjunction with a tire building apparatus.

FIG. 2b is a partial broken view of FIG. 2a employing an optical scanning device.

FIG. 2c is a partial broken view of FIG. 2a employing an edge following mode of the inventive device.

Figure 2A:
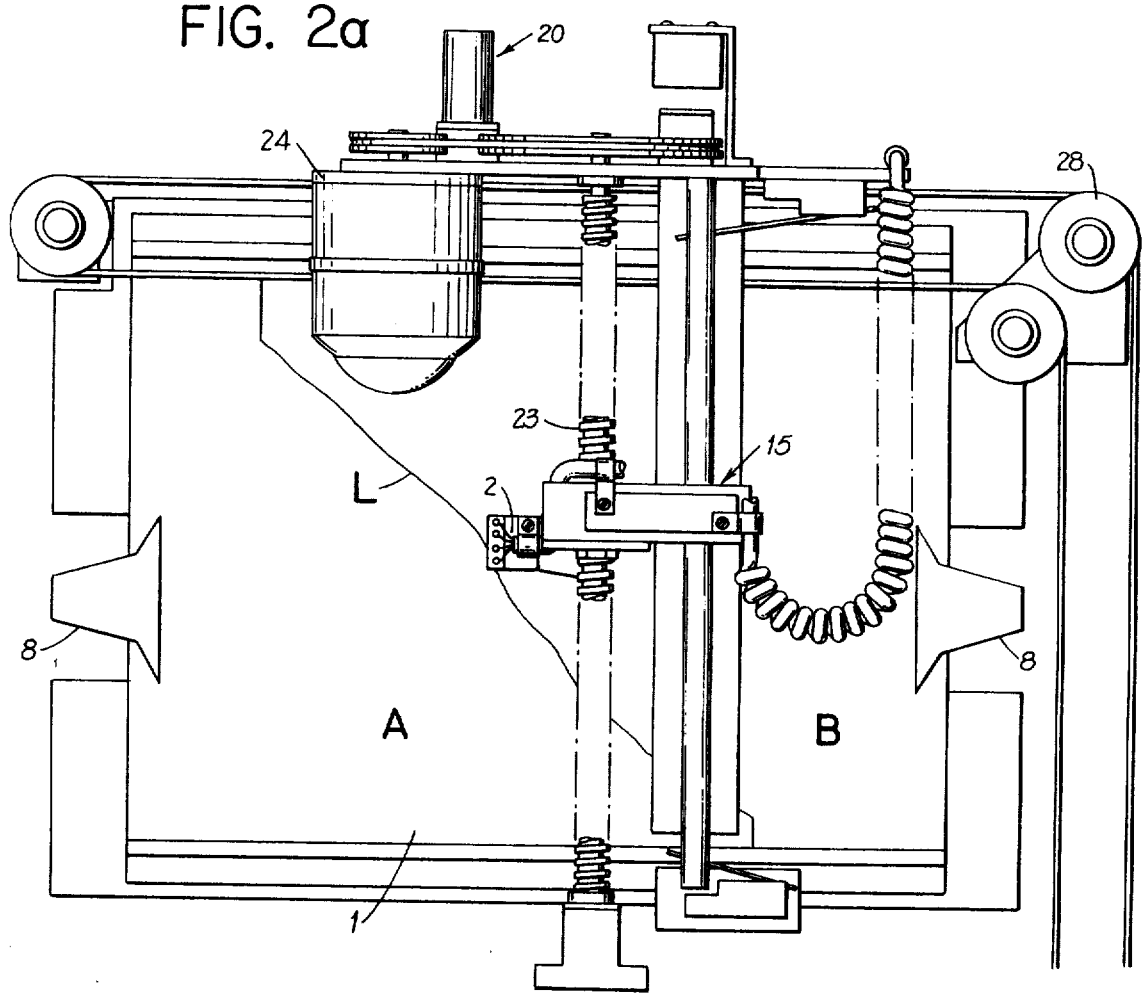
FIG. 2a is a plan view of the program assembly employed by the invention using a magnetic sensing device.

By way of background, the present invention employs a sensing system as part of the overall control assembly whereby a predefined configuration of tire tread contour is defined by a line L scribed on a especially constructed electro-conductive chart 1. According to FIG. 1 a sensing assembly such as a magnetic sensing line follower or an optical scanning device or edge following system 2 is caused to cooperate with the scribed line L and follow its trace thereby, providing the necessary response to permit the programming of a tire building machine such as is shown and described in U.S. Pat. No. 3,177,918 enabling the deposition of rubber ribbon. (The reference numerals in this application do not necessarily correspond to those of the patent, nor Assignees copending application). In effect, the program is caused to be mechanically or electrically coupled to the apparatus 3 governing the rotation of the tire building machine. The sensing device is additionally locked into the horizontal movement of the tire building machine which will in turn allow for proper placement of rubber ribbon on the tire surface 4. In order to precisely govern the tread contour characteristic, the signal received from the sensing device 2 as it moves along the chart 1, is provided with an amplification system such that the output of the amplifier is inter-faced with a drive system containing a controller 6 and a motor 7. The motor 7 positions the tire building machine 3 for proper placement of the ribbon onto the tire surface 4.

In accordance with the invention, once an initial tread contour is established, such contour is transferred by suitable means onto a special chart 1, such as manufactured by Research Inc., Minneapolis, Minnesota and identified as Metalized Chart Paper No. CMR51. In turn, the chart 1 is inserted into an operating position prior to initiating the actual ribbon deposition operation. By way of further explanation, the kind of chart paper employed is one that is characterized by having a conductive characteristic with an insulated backing. Once the line L reflecting the tire contour is placed upon such chart paper, the chart is caused to be divided into two distinctive parts, A,B each divided by the line thereon. Next, the chart paper is placed in position onto an insulated holder 8 and a voltage is applied to each of the two halves A,B of the chart 1. Such voltage causes the respective halves to be in an out of phase condition. Next, the line sensing head 2, such as a magnetic pick up is caused to sense the line L on the chart 1. The sensing device or reading head 2 employed is one that is suitably designed for scanning a null position on the chart 1, which position is the scribed line L of the chart. It follows, with an out of phase voltage placed across the program chart, the reading head 2 is able to distinguish a position relative to the scribed line L on the chart 1. As the sensing device moves away from such line L, a voltage differential is generated at the reading head reflecting movement away from such null. Simultaneously therewith, the voltage that is developed from the reading head or sensor 2 is fed to an amplifier 9. In turn, the amplifier generates a signal to a servo amplifier which causes the tire building apparatus 3 to move toward the scribed line L on the chart 1.

Figure 3:
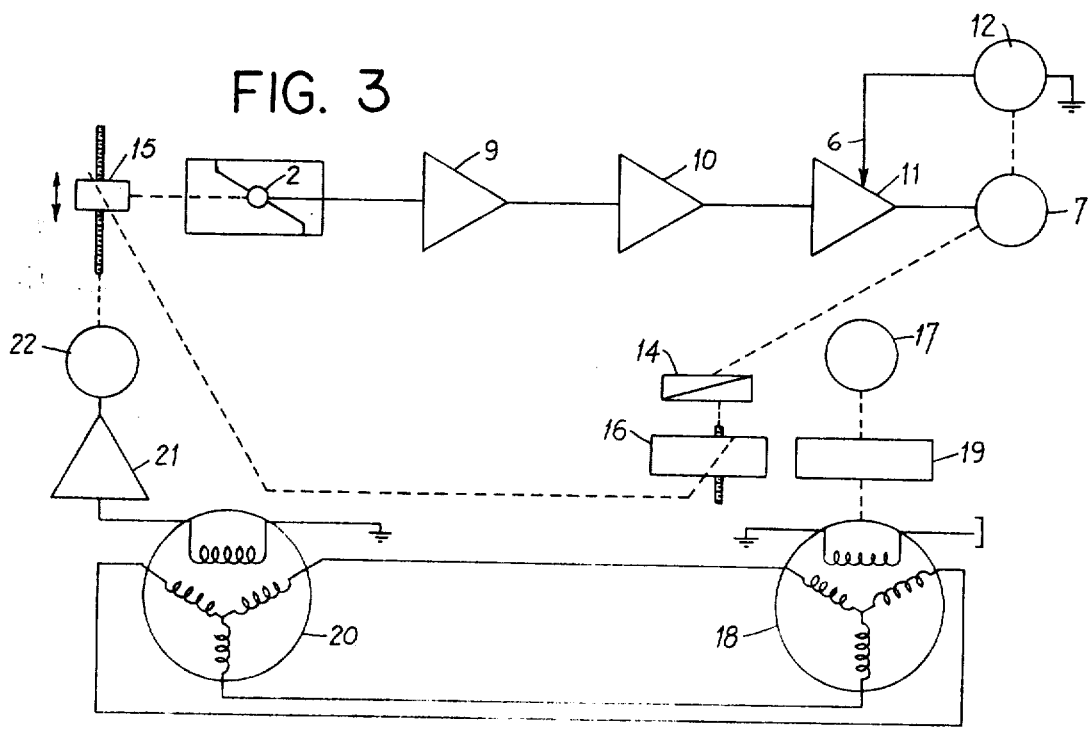
FIG. 3 is a block diagram of the invention and associated control apparatus.

The above will be more fully understood with reference to FIG. 3, a block diagram.

After a line is scribed on electro-conductive paper, pick-up a is positioned to sense such line and produces an AC signal that is fed into an AC signal amplifier 9 which amplifies the signal to a useable level. In turn, this signal is fed into an A/D (analog/digital) converter 10 from which a d.c. signal is produced. The d.c. signal feed into a d.c. motor 7 which governs a ribbon applicator apparatus 3 i.e., apparatus of the type disclosed and described in U.S. Pat. No. 3,177,918; the stability of the motor 7 is governored by tachometer 12 which feeds back into controller 11; the tachometer 12 is electrically connected to the d.c. motor control 11. The applicator apparatus 3 also includes a screw arrangement 14 which is mechanically connected to same. The applicator 3 in turn forms a closed loop and is either electrically or mechanically connected to a screw 15 and pick-up 2. The screw 15 governs the vertical displacement of the pick-up 2 with respect to the scribed line; whereas, screw 16 governs the horizontal displacement of pick-up 2.

A second control loop has associated therewith a spin motor 17 which governs tire rpm. Such spin motor 17 is connected to a synchro transmitter 18 through a clutch 19 and through to a synchro receiver 20.

The transmitter 18 rotates in response to spin motor rpm. Synchro transmitter 18 transmits a voltage to synchro receiver 20, a differential voltage is generated out of the receiver 20 and is transmitted to amplifier 21 and through to motor 22. Motor 22 causes screw 15 to rotate and urges pick-up 2 away from scribed line in vertical direction. At this point, the cycle tends to repeat itself by causing the pick-up 2 to seek out the scribed line L through an a.c. signal which is transmitted on through to applicator 3. In turn, the applicator 3 moves to a position consistent with the scribed line L; thus, causing screw 15 and pick-up 2 to assume an on line position. Thus, the inventive system employs a closed loop servo system which continuously seeks out a null position on scribed line. Obviously, the ultimate tread contour is function of slope of such scribed line.

It is to be understood that the aforementioned can equally apply in situations where it is desirable to azimuth the line on the spin motor 17 with respect applicator 3 instead the moving applicator 3 as mentioned above.

Since the sensor 2 is mechanically or electrically linked to the tire building apparatus 3 the control system will hunt until the null position of the scribed line L is adhered to or found. When this occurs, the output of the sensing head 2 will cause the drive system to turn off. As is shown in FIG. 1, the reading head or sensor apparatus 2 is mechanically linked 21 to the tire building apparatus 3. As contemplated by the present invention, the control system is provided with a sensing control 2 which is positionable in the Y coordinate system along a screw 23. The screw 23 itself is caused to move by a motor 24 which in turn is linked electrically or mechanically 28 to tire motion rotation so as to govern the orientation in the Y (vertical) direction during the wrapping operation. The mechanical linkage 21 for tire surface 4 movement in the Y direction is directly coupled to the position of the screw 23. An electric connection is provided to the motor 7 governing the tire apparatus 3 rotation so as to correlate Y axis movement of the screw 23.

The electrical arrangement employed in connecting the sensing head 2 to the rotation of the tire mandrel 25 of the tire building apparatus 3 makes use of two synchro's 18, 20 for position control. As the tire mounting system 25 rotates, a first of such synchro's 18 is caused to rotate as well. In turn, synchro 18 transmits a signal to a second synchro 20 located on the sensing device 2. The second synchro 20 is caused to maintain a position for the sensing device 2 to follow. As a result, what is provided is a system in which for every revolution of the tire building apparatus 3, the sensing or reading head 2 is caused to move a predetermined vertical distance on the chart. Thus, with the sensing head 2 moving at a rate proportional to the rotation of the tire building apparatus 3, the head 2 is caused to move away from the program line L on the chart 1.

As the tire building apparatus 3 rotates, it is necessary for the sensing device 2 to move across the chart 1 at a rate proportional to the tire building apparatus speed and as defined by the slope of the scribed line L. In turn, this causes the amplifier 9 to receive a signal from the sensing head amplifier. The tire building mandrel assembly 25 is then caused to move at a proportional and defined rate. A change in rate of tire mandrel assembly movement causes a corresponding change in the rate the tire building apparatus 3 traverses in the tire radial direction across the ribbon feeding device 26.

The inventive concept contemplates that the principle and essential features of control may be attained by using an optical pick-up system.

According to FIG. 2b, the sensor head 2 may be replaced with an optical pick-up system. Such optical pick-up system is employed to follow a contrasting line drawn on standard paper. It also can be utilized for edge following on a contrasting surface placed on such paper. In operation, the system employing the optical reading arrangement controls the machine function in a manner similar to that explained hereinbefore with a magnetic sensor. The pick-up 2 constantly seeks the line or edge in order to maintain the proper position on the line or edge as compared to the applicator or mandrel position. In operation, the standard sheet of paper is placed on the programmer assembly and held in place with hold-down clips 8. The screw assembly 15 moves the optical sensor 2 away from the line or contrasting edge. When this occurs, the optical sensor 2 then senses an off-line condition which sends an error signal to the amplifier 9 which in turn causes the optical sensor 2 to tend back to the line in accordance with the arrangement and method shown and discussed with respect to FIG. 3.

The paper and optical sensor must be compatible, such that a definite contrast in color exists, since this provides the optical pick-up with a point enabling it to track.

As can be seen from the accompanying FIGS. 1–3, the aforementioned apparatus is relatively compact and is one in which it is possible to move the program chart 1 rather than the sensing head 2 without in any manner diminishing the necessary control. The fact remains the present invention contemplates utilizing either a moving chart 1 or a moving sensing head 2 with respect to the chart 1 in a given operation if the requirements demand it. The present apparatus may also be employed in the same manner to control the motion of a movable tire building head 26 with a stationary tire 4. The control system allows a method by which tire ribbon wrap can be counted by the synchro following the tire building apparatus. Should any change in the tire tread contour be desired, it remains but a simple matter to place a fresh line L on the chart 1 and initiate the program in the manner indicated above. Since the system is provided with position control with respect to a predefined contour, repeatability and accuracy are assured. Furthermore, with continuous movement of the tire building apparatus 3 the overall tread build-up is not dependent upon the movement of one integral step for every revolution of the tire building assembly with the result that fast and controlled tire contour build-up is possible. Lastly, an obvious result of eliminating incremental stepping of the entire system is a lessening of the dynamic stress and distortion of the apparatus.

This invention has been disclosed with respect to certain preferred embodiments and it will be understood that modifications and variations thereof will become obvious to persons skilled in the art and are intended to be included within the spirit and purview of this application and the scope of the appended claims.

What is claimed:

1. Method of controlling a deposition of elastomeric material in accordance with a pre-defined profile which corresponds to a tire tread contour, including the steps of: scribing a line on an electro-conductive paper which line represents tire tread contour in cross-section; positioning a sensing device in proximity to said line whereby said device being connected to supply means for providing said elastomeric material; generating an electrical signal in response to deviation by said sensing device from said scribed line causing the rate of supply of material to be deposed to advance in accordance with such electrical signal; directing the speed of rotation of a tire surface by energizing motor means by an electrical signal responsive to the position of said sensing device with respect to said scribed line; and continuously positioning said sensing device in the X-Y coordinates responsive to the disposition of freshly deposited elastomeric material with respect to adjacent layers of such deposited material.

2. A method as claimed in claim 1, including the steps of feeding an electrical signal generated as a result of said sensing device hunting for a null position is respect to said scribed line into amplifier means; feeding said amplified signal into analog/digital converter means for producing a d.c. signal to thusly energize motor means driving said elastomeric material supply means; moving said sensing means along said scribed line by adjustment means responsive to the X-Y coordinate position of said sensing means with respect to said scribed line as such elastomeric material is being fed.

3. A method as claimed in claim 1, including the steps of rotating a tire to be surfaced with elastomeric material in response to motor means, where such motor means are electrically connected to synchro transmitter means adapted to generate voltage levels consistent with tire surface rpm; transmitting said voltage differential to a synchro receiver for transmission to amplifier means and energization of said sensing device through adjusting means caused by motor means responding to the electrical signal generated by said synchro receiver; and repeating the generation of voltage differentials responsive to tire rotation for a prescribed number of times consistent with the number of tire ribbon wraps.

4. An apparatus for controlling the deposition of elastomeric ribbon material upon a tire surface consistent with a pre-defined profile of the ultimate tire cap layer surface as identified by a specifically shaped profile including an electro-conductive substrate adapted to receive said pre-defined cap layer profile; a sensing assembly disposed in proximity to said substrate for seeking a null position with respect to said profile, wherein said sensing assembly includes an optical scanning means disposed upon ways being positionable in the X-Y coordinate axis responsive to the movement of a tire surface to be worked upon, said sensing assembly being coupled to said tire orientation apparatus, whereby deviation of said sensing device from said pre-defined contour causes an electrical signal to be generated allowing the tire building apparatus to rotate in response to said electrical signal; control means coupled to said tire building apparatus enabling movement of said tire building apparatus with respect to elastomeric material being disposed thereon, consistent with the position of said sensing device with respect to said scribed line.

5. An apparatus as claimed in claim 4, wherein: said substrate is defined by electro-conductive paper having an insulated backing, whereby, once a scribed line is disposed thereon an electrical signal is caused to pass therethrough, the respective sections of said paper are placed in an out of phase condition, thereafter said sensing device is caused to sense said scribed line on said paper, such that any voltage differentials resulting from the movement of said sensing device away from a null position produces a voltage differential; and amplifier means in electrical circuit relationship with said tire building apparatus adapted to receive an electrical signal from said sensing device for transmission to motor means governing the movement of said tire building apparatus.

6. An apparatus as claimed in claim 4, wherein: said sensing device is adapted to move in vertical and horizontal positions respectively by means of screw means responsive to the orientation of said tire motion rotation during the tire building operation.

7. An apparatus as claimed in claim 4, including: a control system provided with first and second synchro means, said first synchro means being adapted to rotate in concert with an apparatus holding said tire for rotation, whereby, rotation of said tire causes an electrical signal to be generated and transmitted to second synchro disposed in electrical circuit relationship to said sensing device; said second synchro being adapted to maintain a position for said sensing device to follow enabling said sensing device to be positioned in the vertical direction in response to the revolution of said tire building apparatus; amplifier means connected to said sensing device for transmitting a signal as such sensing device is caused to move away from said scribed line, simultaneously therewith causing an electrical signal sent to said tire building apparatus and urging it to move at a proportional and defined rate in the radial direction consistent with elastomeric material ribbon feed rate.

8. A method as claimed in claim 1, including the steps of: feeding an electrical signal generated as a result of having an optical pick-up sensing device hunting for a null position with respect to said scribed line into amplifier means; feeding said amplified signal into converter means for producing a d.c. signal to thusly energize motor means driving said elastomeric material supply means; and moving said optical pick-up sensing device along said scribed line by adjustment means responsive to the X-Y coordinate position of said sensing means with respect to said scribed line as such elastomeric material is being fed.

9. A method as claimed in claim 8, including the steps of: urging an optical sensing device to sense upon color contrasting areas formed on a sheet of plain paper whereby a null position is continuously sought by said sensing device.

10. An apparatus as claimed in claim 4, wherein: said sensing assembly includes an optical pick-up device adapted to follow a scribed contrasting line on a standard paper.

11. An apparatus as claimed in claim 1, wherein: said sensing device includes an edge following apparatus adapted to follow contrasting areas of color formed on a plain sheet of paper.

* * * * *